United States Patent [19]

Powell

[11] 4,100,091

[45] Jul. 11, 1978

[54] PROCESS AND MEANS FOR ABSORBING AND RELEASING THERMAL ENERGY BY UTILIZING THE ALLOTHOPIC CHANGE OF ENDO-5-NORBORNENE-2, 3-DICARBOXYLIC ACID ANHYDRIDE WITH HEAT

[75] Inventor: Justin C. Powell, Wappingers Falls, N.Y.

[73] Assignee: Texaco Inc., New York, N.Y.

[21] Appl. No.: 759,962

[22] Filed: Jan. 17, 1977

[51] Int. Cl.² .................................................. C09K 5/00
[52] U.S. Cl. ...................................... 252/70; 126/270; 126/400; 165/104 S; 165/104 M; 260/346.6
[58] Field of Search .................. 252/70, 73, 79, 67, 252/62; 260/346.6; 165/104 S, 104 M; 126/400, 263, 270

[56] References Cited

U.S. PATENT DOCUMENTS

| | | | |
|---|---|---|---|
| 1,944,731 | 1/1934 | Diels et al. | 260/346.6 X |
| 2,423,234 | 7/1947 | Gerhart et al. | 260/346.6 X |

OTHER PUBLICATIONS

Destro et al., "The Molecular Structure of S-Norbornene-2,3 Endo-Dicarboxylic Anhydride", Tetrahedron Letters, No. 57, Pergamon Press, 1968, 5955–5958.

*Primary Examiner*—Harris A. Pitlick
*Attorney, Agent, or Firm*—Thomas H. Whaley; Carl G. Ries; Henry W. Archer

[57] ABSTRACT

Thermal energy, in particular, solar energy is absorbed and released by utilizing the allotropic change of endo-5-norbornene-2,3-dicarboxylic acid anhydride with heat. The thermal energy is absorbed above 90° C, stored above 40° C, and released at temperatures below 40° C.

5 Claims, No Drawings

PROCESS AND MEANS FOR ABSORBING AND RELEASING THERMAL ENERGY BY UTILIZING THE ALLOTHOPIC CHANGE OF ENDO-5-NORBORNENE-2, 3-DICARBOXYLIC ACID ANHYDRIDE WITH HEAT

BACKGROUND OF THE INVENTION

Field of the Invention

This invention relates to the storage of thermal energy by the allotropic change of endo-5-norbornene-2,3-dicarboxylic acid anhydride.

One troublesome problem encountered with energy forms such as solar energy, which is intermittent in nature, is storing the energy until it is needed.

The present invention represents a solution to that problem and is based on the discovery that endo-5-norbornene-2,3-dicarboxylic acid anhydride (NDAA) can store thermal energy at about 93° C and release such energy at temperatures below 40° C. The crystal structure of NDAA has been extensively studied at about room temperature and the transformation of the endo to the exo isomer has also received much attention in the literature. No previous investigators are known to have reported calorimetric changes at $\approx$ 92° C, or thermal energy absorption, storage, and release for NDAA.

The endotherm onset for the compound of the invention is about 70° C below its melting point (about 164°–166° C) observed by differential scanning calorimetric (DSC) studies. After passing through the endotherm the endotherm could not be observed if the material were cooled above about 48° C and reheated. Thermogravimetric analysis on a fresh sample showed less than 0.1 wt. percent loss up to 140° C thereby ruling out a sublimation effect.

The compound of the invention can be synthesized by a Diels-Adler reaction between maleic anhydride and cyclopentadiene. (L. F. Fieser, *Organic Experiments*, D. C. Heath (Boston) 1964 Chapter 15 p. 83.)

In studies leading to the present invention, DSC was used to measure the transition points of heat uptake and release. The endothermic onset was 95.0 ± 0.5° C initially for fresh NDAA. On subsequent cycles of cooling and reheating, the onsets were 91.0° ± 0.5° C at a heating rate of 10° C/min. Upon rapid cooling, the onsets of the exotherm were 40.0° C, 36.5° C, and 35.0C (all ± 0.5° C), respectively, in succeeding cycles.

The energy absorbed was measured using the melting of pure indium as a standard. The ΔH for NDAA averaged 3.3 ± 0.3 Kcal/mole (20 ± cal/g). This is compared to the allotropic change for orthorhombic sulfur to monoclinic sulfur at 95.6° C: 0.088 Kcal/mole (2.74 cal/g). The exothermic energy appeared to be of the same order of magnitude as that absorbed.

The 13.12 mg sample of NDAA was as much as 9° C cooler than the temperature of a reference thermocouple at 97° to 100° when heated at 10° C/min and as much 50° hotter than the reference at 36°–44° C when cooled.

Infrared spectroscopy indicated no chemical changes were associated with the uptake or release of heat. Spectra were recorded of a mineral oil mull of NDAA at 28° C, 82.5° to 88° C, 101°–102° C, and again at 27° C in that order in the 2.5 to 15.0 micrometer region using an electrically heated AgCl cell. There was a slight shift in the intensities of 3 absorption peaks between 11.8 and 12.9 micrometers which occurred gradually during heating and which did not change upon cooling even after standing overnight. This is attributed to a physical change in the mull.

Polarized light microscopy (PLM) showed an allotropic change at the endothermic transition point. Using a petrographic microscope equipped with a hot stage the following observations were made:

At room temperature NDAA crystals are anisotropic (bright and colored) in the dark field of crossed polarized light. Upon heating, the crystals lose their double refraction (become dark) between 92° C and 97° C. Small crystals, neat or in a mull (including the mull previously heated in the IR experiment discussed previously) gave a sharp crystal structure change at 94.5° C at 2°–4° C/min. Under normal light the NDAA undergoes no significant change.

The infrared data on NDAA obtained in a nujol mull confirmed its structure as follows:

anhydride: med. absorption between 5.40 & 5.50 micrometers
strong absorption between 5.65 & 5.75 micrometers
other strong absorptions between 8.0 and 15.0 micrometers
are between 8.15 & 8.25 micrometers
between 9.25 & 9.35 micrometers
between 11.00 & 11.30 micrometers
between 13.70 & 13.80 micrometers The spectrographic data indicate no molecular structural change as the solid is heated or cooled. The heat absorption and release is probably due to a crystal structural change not observable by IR spectroscopy. The data rule out a molecular change such as dehydration of the acid to the anhydride or a conversion to the exo isomer. The exo isomer is known to be formed at temperatures much higher ($\approx$ 165° C) than the sharp transition point observed and is not indicated by IR.

The invention is further illustrated in nonlimiting fashion by the following Example.

Fresh crystals of NDAA are warmed on a hot plate near a window to 40°–60° C. When some of these are examined by DSC, no exotherm is observed on cooling to 30° C. A lens is then used to concentrate sunlight on the crystals to heat them to 93°–113° C. The lens is then removed and the crystals are allowed to cool to about 50° C. Some of these crystals are quickly transferred to the DSC cell at 50° C. When these crystals are cooled an exotherm is observed between 40° and 35° C.

Several analogous compounds were examined by PLM to identify any structural features which might be associated with the thermal properties; however, no such features were found. The compounds examined were the acid of NDAA, maleic anhydride, cis,cis,cis,-cis,1,2,3-cyclo pentane tetracarboxylic dianhydride, and both the cis- and the trans-isomers of 1,2-cyclohexane dicarboxylic anhydride.

NDAA's properties are believed due to an allotropic change from orthorhombic crystals to another and unknown crystalline state. Its application are many. It can be used as an insulator in buildings to absorb solar energy during the day and give off heat at night. Shapes of this material can be used as batteries by being charged in concentrated sunlight or exposed to waste heat from commercial sources and then placed in a cool area. Finely divided fragments of NDAA can be coated by an impervious transparent layer based on silicone and suspended in an aqueous medium or suspended in a nonreactive medium such as a light mineral oil and used in heat exchangers.

It should be noted that NDAA is also known as: endo-5-norbornene-2,3-dicarboxylic anhydride cis-3,6-endomethylene-$\Delta^4$-tetrahydrophthalic anhydride, bicyclo [2.2.1] hept-5-ene-2,3-dicarboxylic anhydride.

What is claimed is:

1. A process for absorbing, storing and releasing thermal energy which comprises exposing anisotropic, orthorhombic, endo-5-norbornene-2,3-di-carboxylic acid anhydride crystals to heat at a temperature in the range of 93°–160° C to cause absorption of heat energy accompanied by an allotropic change to another crystalline state at said temperature, storing said crystals at a temperature above 40° C and cooling said crystals at a temperature below 40° C., to release the stored energy.

2. The process of claim 1 wherein said heat is sunlight.

3. The process of claim 2, wherein said exposing to heat step includes the step of concentrating sunlight on said crystals.

4. The process of claim 1, wherein said exposing to heat step includes exposing said crystals to waste heat from commercial sources.

5. Material for storing, and releasing thermal energy at a temperature above 30° C consisting essentially of endo-5-norbornene-2,3-dicarboxylic acid anhydride in an allotropic crystalline state produced by heating said anhydride to a temperature of about 93° to 160° C.

* * * * *